No. 648,736. Patented May 1, 1900.
W. P. FREEMAN.
AUTOMOBILE TRUCK.
(Application filed May 6, 1899.)
(No Model.) 2 Sheets—Sheet 2.
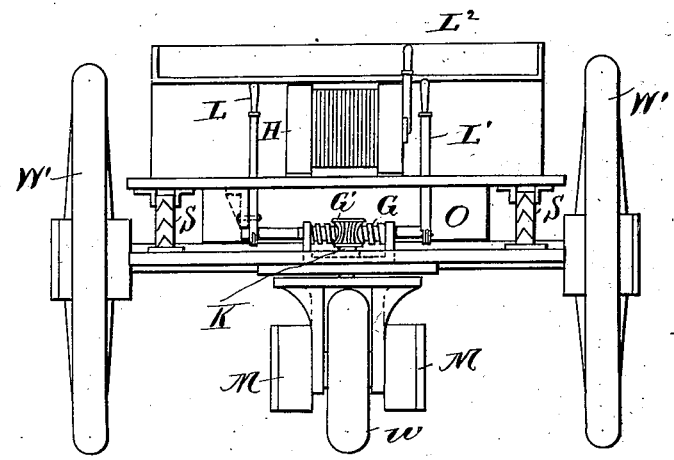
Fig. 3.
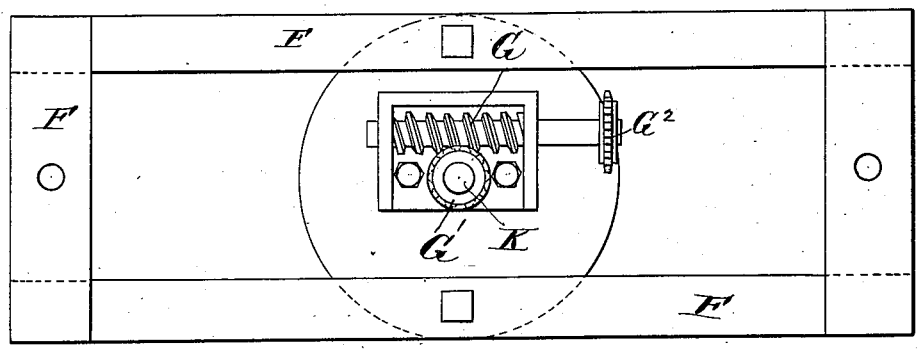
Fig. 4.
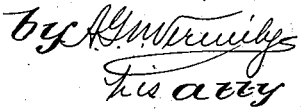

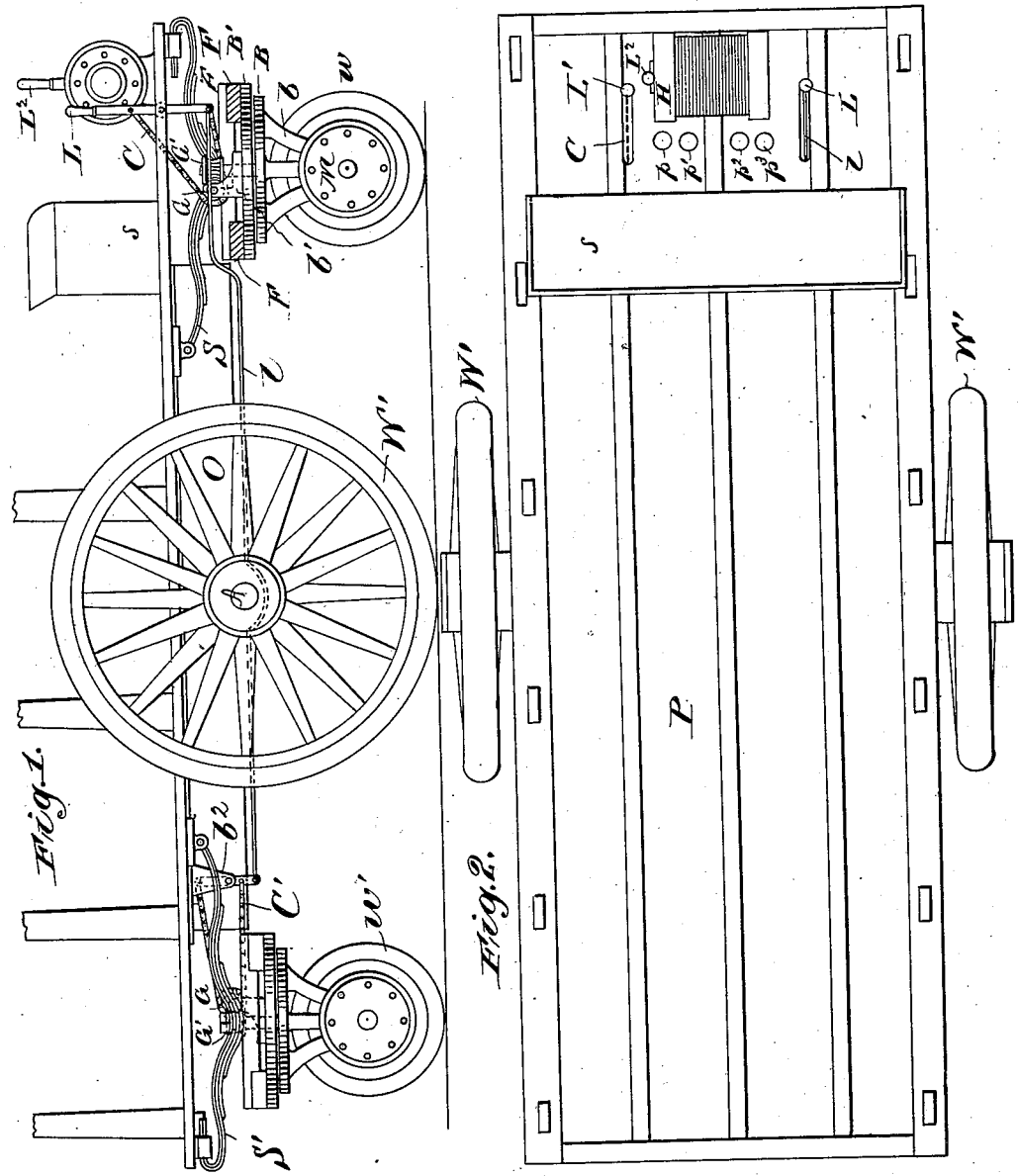

UNITED STATES PATENT OFFICE.

WARREN P. FREEMAN, OF NEW YORK, N. Y., ASSIGNOR TO THE EMPIRE ELECTRICAL MACHINERY COMPANY, OF SAME PLACE.

AUTOMOBILE TRUCK.

SPECIFICATION forming part of Letters Patent No. 648,736, dated May 1, 1900.

Application filed May 6, 1899. Serial No. 715,770. (No model.)

*To all whom it may concern:*

Be it known that I, WARREN P. FREEMAN, a citizen of the United States, and a resident of New York, in the county of New York and State of New York, have invented certain new and useful Improvements in Automobile Trucks, of which the following is a specification, reference being had to the accompanying drawings, forming part of the same, in which—

Figure 1 is a side elevation of a truck or freight-carrying vehicle embodying my invention. Fig. 2 is a plan view of the same. Fig. 3 is a front elevation thereof; and Fig. 4 is an enlarged plan view of the supporting-frame, showing also the worm and worm-gear by means of which the vehicle may be steered.

My invention relates to automobile or so-called "horseless" vehicles; and it consists especially in the arrangement of devices by which I attain ease in steering the vehicle, together with other features hereinafter set forth in the claims.

To turn a single wheel, especially if there be no great weight upon it, is much easier than to turn two wheels at opposite ends of a single rigid axle, and that peculiarity is utilized in the device I am about to describe.

I first build a truck body or platform P quite similar in its general features to those already well known, though special forms may be provided for particular uses. This body I mount primarily upon an axle carrying a pair of substantial wheels W W', intended to support the main part of the weight, interposing springs between, if desired. The axle A is intended to be located at such a point that the load may be to a great extent balanced thereupon—that is, as much may be placed forward of the axle-line as may be placed aft thereof. I then provide frames F of about the width of the truck-body, preferably one for each end. They may be and usually are formed of two parallel beams joined at the ends by bolster-blocks, as shown in Fig. 4, and springs S S', secured to the bolster-blocks and the platform, are interposed between said blocks and the platform P to assist in supporting that and its load. Centrally of the frame F, I bolt fast or otherwise secure the upper part B' of a fifth-wheel.

$w$ $w'$ are guiding and power wheels, the power being derived, preferably, from motors M, mounted on the same axis as wheels $w$ $w'$ and geared thereto, though that as a separate feature is not a part of the invention intended to be herein claimed and other means of applying power to wheels $w$ $w'$ might be employed. On suitable brackets $b$, extending upward from wheels $w$ $w'$, I mount the under part B of the fifth-wheel or swivel device, and from it or the frames supporting wheels $w$ $w'$ a king-pin K projects upward. Mounted in pillow-blocks $b'$ upon part B' of the fifth-wheel is a short shaft carrying a worm G, and secured to the king-pin K and meshing with worm G is a worm-wheel G'. Then on the shaft of the worm-gear I mount another gear or sprocket wheel $G^2$. Pivoted in the platform P and preferably extending below as well as above it are steering-levers L L', one to operate wheel $w$ and the other to operate wheel $w'$. From a point above the pivot of lever L' a sprocket-chain C extends through a slot in the platform to and about sprocket-wheel $G^2$ and thence to a point on lever L' below its pivot. For wheel $w'$ I provide a supplemental lever mounted in a bracket $b^2$, from which sprocket-chain C' extends to and about the sprocket-wheel $G^2$ of the rear-end steering device, and a long link or rod $l$ connects the said supplementary lever with the lower arm of the hand-lever L.

$s$ is the driver's seat, so placed as to render it easy for him to operate the levers, and $p$ $p'$ $p^2$ $p^3$ are contact breakers or switches so connected that the depression of $p$ closes the circuit of the motor of the front wheel $w$ to drive it ahead and depressing $p'$ does the same for wheel $w'$, while depressing $p^2$ and $p^3$, respectively, closes the circuits of these motors to reverse them.

H is a hoisting-motor controlled by hand-lever $L^2$, and O represents a storage battery secured to the under side of platform P.

To move forward, the driver needs but to depress his left foot, and the circuits of the motors are closed and the power-wheels are revolved and the vehicle moved forward. If it is to turn to the right, the driver seizes the hand-lever L' and swings it forward or back, as the case may be, to rotate gear $G^2$ and worm G, and consequently turn worm-wheel G' and its connected king-pin K, with the attached wheel w, in the proper direction, at the same time, if he desires, operating lever L to swing wheel w' in the proper way to assist the movement of the truck. Thus it is apparent that either or both wheels may be readily operated to cause the truck to move as desired and that while it may be very strongly built that may be done without interfering with thus operating the steering devices.

What I claim, and desire to secure by Letters Patent, is—

1. A vehicle composed of a platform mounted upon an axle which is provided with two main carrying-wheels and is located about midway of the ends of said platform, and two steering and power wheels, one at each end, located midway between the sides of said platform and swiveled thereto.

2. A vehicle composed of a platform mounted upon an axle which is provided with two main carrying-wheels, and is located midway between the ends of said platform, a steering and power wheel at each end located midway between the sides of the platform and swiveled thereto, hand-levers projecting above the platform and gearing devices interposed between the hand-levers and the steering wheels.

3. The combination with a vehicle of a steering-wheel swiveled to the frame, a king-pin extending upward therefrom and carrying a worm-wheel, a worm-gear secured to the platform and carrying a sprocket-wheel, a hand-lever mounted in the platform and a sprocket-chain secured to said lever and passing about said sprocket-wheel.

4. The combination with a vehicle of a steering-wheel swiveled to the frame, a king-pin extending therefrom and carrying a worm-wheel, a worm-gear secured to the platform and carrying a sprocket-wheel, a hand-lever and intermediate gearing between said hand-lever and said sprocket gear-wheel, whereby the operating of said hand-lever will turn said steering-wheel.

Signed at New York, in the county of New York and State of New York, this 17th day of April, A. D. 1899.

WARREN P. FREEMAN.

Witnesses:
PETER B. VERMILYA,
A. G. N. VERMILYA.